US006798550B1

(12) United States Patent
Wang et al.

(10) Patent No.: US 6,798,550 B1
(45) Date of Patent: Sep. 28, 2004

(54) SPATIAL LIGHT MODULATOR

(75) Inventors: Feiling Wang, Medford, MA (US); Kewen Kevin Li, Andover, MA (US); Dean Tsang, Burlington, MA (US); Hua Jiang, Mansfield, MA (US)

(73) Assignee: Corning Applied Technologies Corporation, Woburn, MA (US)

( * ) Notice: Subject to any disclaimer, the term of this patent is extended or adjusted under 35 U.S.C. 154(b) by 165 days.

(21) Appl. No.: 09/715,867

(22) Filed: Nov. 17, 2000

Related U.S. Application Data

(60) Provisional application No. 60/166,380, filed on Nov. 18, 1999.

(51) Int. Cl.[7] .................................................. G02F 1/03
(52) U.S. Cl. ...................... 359/245; 359/254; 359/248; 359/260
(58) Field of Search ................................ 359/245, 248, 359/254, 260, 279, 454, 519, 589, 579, 584, 585, 723, 722; 372/20, 26, 32

(56) References Cited

U.S. PATENT DOCUMENTS

| | | | | | |
|---|---|---|---|---|---|
| 4,786,128 | A | * | 11/1988 | Birnbach | 385/8 |
| 4,925,276 | A | * | 5/1990 | McMurray et al. | 349/28 |
| 5,068,749 | A | * | 11/1991 | Patel | 349/198 |
| 5,637,883 | A | * | 6/1997 | Bowman et al. | 257/21 |
| 5,768,003 | A | * | 6/1998 | Gobeli | 359/254 |
| 6,025,950 | A | * | 2/2000 | Tayebati et al. | 359/244 |
| 6,091,463 | A | * | 7/2000 | Robinson et al. | 349/25 |
| 6,211,993 | B1 | | 4/2001 | Wang et al. | 359/260 |
| 6,317,251 | B1 | * | 11/2001 | Wang | 359/318 |
| 6,373,620 | B1 | * | 4/2002 | Wang | 359/315 |

FOREIGN PATENT DOCUMENTS

| | | | |
|---|---|---|---|
| EP | 0 380 326 A2 | 8/1990 | |
| GB | 1 172 852 A | 12/1969 | |
| GB | 2 261 522 A | 9/1993 | |
| JP | 04 018767 A | 1/1992 | |

OTHER PUBLICATIONS

Wang, F., et al., "Large Electrooptic Modulation Using Ferroelectric Thin Films in a Fabry–Perot Cavity," *Proceedings of the IEEE International Symposium on Applications of Ferroelectrics* 9:683–686 (1994).

Tsen–Hwang, L., et al., "Two–Dimensional Spatial Light Modulators Fabricated in Si/PLTZ," *Applied Optics* 29(11): 1595–1603 (1990).

Li, K. K., et al., "An automatic dip coating process for dielectric thin and thick films," *Integrated Ferroelectrics* 3(1):81–91 (1993).

(List continued on next page.)

*Primary Examiner*—Hung Xuan Dang
*Assistant Examiner*—Tuyen Tra
(74) *Attorney, Agent, or Firm*—Juliana Agon

(57) ABSTRACT

A modulator formed with a solid state electro-optic material having a pixellated structure interconnected to a circuit on a semiconductor substrate.

Silicon CMOS integrated circuit that can include random access memories (RAMs) are used as a substrate and interfaced to solid state electro-optic materials coated thereon. In particular, the electro-optic modulators are controlled by RAM cells to produce a modulation of reflected light. SRAMs can be used with connection to the SRAM cell flip-flop. DRAMs can be used with the modulator replacing the DRAM storage capacitor. The SLM thus formed can be connected to a digital computer and controlled as if were a being written to as a memory, but other IC structures can also be used. In order to enhance the modulation effects, the electro-optic material is used as the spacer for a Fabry-Perot etalon structure that is also deposited on the semiconductor substrate. PLZT is a suitable electro-optic material.

18 Claims, 8 Drawing Sheets

OTHER PUBLICATIONS

Wang, F., et al., "Ferroelectric–on–silicon modulators for high–density optical interconnects," Conference on Lasers and Electro–Optics, CLEO '98, 414 (May 3–8, 1998).

Wang, F. and Haertling, G.H., "Integrated reflection light modulator using ferroelectric films on silicon," Conference on Lasers and Electro–Optics, Maryland, CLEO '95 302 (May 22–26, 1995).

Wang, F., et al., "Electro–optic measurements of thin–film materials by means of reflection differential ellipsometry," *J. Appl. Phys.* 78(1), Jul. 2, 1995.

* cited by examiner

SPATIAL LIGHT MODULATOR

RELATED APPLICATIONS

This application claims benefit to U.S. Provisional Application No. 60/166,380 filed on Nov. 18, 1999, the entire teachings of which are incorporated herein by reference.

GOVERNMENT SUPPORT

The invention was supported, in whole or in part, by grant numbers F30602-97C-0184 and F30602-97-C-0347 awarded by the Department of the Air Force. The government has certain rights into his invention.

BACKGROUND OF THE INVENTION

A common example of a simple SLM is a liquid crystal computer display. In this, a two-dimensional array a of liquid crystal cell is uniformly illuminated and the transmission of each cell is controlled to from a display on a screen. In a black and white display, each cell corresponds to a pixel in the image.

However, when the illumination is not uniform, such as from another image, an SLM can perform other functions. For example, a correlation can be obtained between the illuminating image and a second image. This is accomplished by driving the SLM with control voltages that would produce the second image if the illumination were uniform. The SLM output from each cell is the product of the pixel amplitude in the illuminating image and the second image. By collecting and measuring the light from the entire SLM output, the correlation between the two images can be obtained.

Besides the simple example, SLMs have been proposed for use in a variety of diverse applications such as radar signal processing, oil field exploration, weather prediction, air flow simulations, image storage and processing, holographic video systems, large database storage, and optical buses between cache memories in multiprocessors.

However, so far, only liquid crystal cells have been used. These materials have the disadvantage of being inherently slow, especially at reduced temperatures that might be encountered outside a laboratory environment. Thus, there is a need for materials with a faster response times.

One of the challenges in making SLMs is the need to individually control a large number of cells. In computer displays, the approach is to use orthogonal transparent strip electrodes on either side of the liquid crystal cells so that each cell is at the intersection of an X-address line and a Y-address line. Individual cells are controlled by timing voltages on selected address lines. In this approach, a sheet of glass is coated with X-address lines and another with Y-address lines and the liquid crystal material is sandwiched between. However, this approach is not suitable for the solid state materials that have faster response times.

SUMMARY OF THE INVENTION

This invention is in the field of amplitude modulation of light. More particularly, it provides a two-dimensional array of amplitude modulators or a spatial light modulator (SLM) using solid state materials formed using a ceramic-on-silicon fabrication process, for example.

Accordingly, the present invention provides a two dimensional pixellated device that uses a material that has an inherently fast response time as an optical switch. By forming the pixellated array on an integrated circuit, a system is provided for controlling the array that is compatible with existing digital signal processing computers.

A silicon CMOS integrated circuit (IC), having random access memories (RAMs), for example, that has been fabricated in a substrate and interfaced to solid state electro-optic materials positioned thereon illustrate a preferred embodiment of the invention. In a particular embodiment, the electro-optic modulators are controlled by RAM cells to produce a modulation in reflected light incident on the device. SRAMs can be used with a connection to the SRAM cell flip-flop. DRAMs can be used with the modulator replacing the DRAM storage capacitor. The SLM thus formed can be connected to a digital computer and controlled as if were a being written to as a memory, but other IC structures can also be used. In order to enhance the modulation effects, the electro-optic material is used as the spacer for a Fabry-Perot etalon structure that is also deposited on the RAM substrate.

A solid state material such as lead lanthanum zirconate titanate. (PLZT) is a suitable electro-optic material. Proper proportioning of the elements in such a material can be used to avoid thermal mismatch of the material and the substrate. A sequence of layers of the solid state material can be deposited in the liquid phase and heated to provide a sufficiently thick layer without thermal mismatch to the existing substrate. The modulator array is then interconnected to the integrated circuit.

Figure 1:
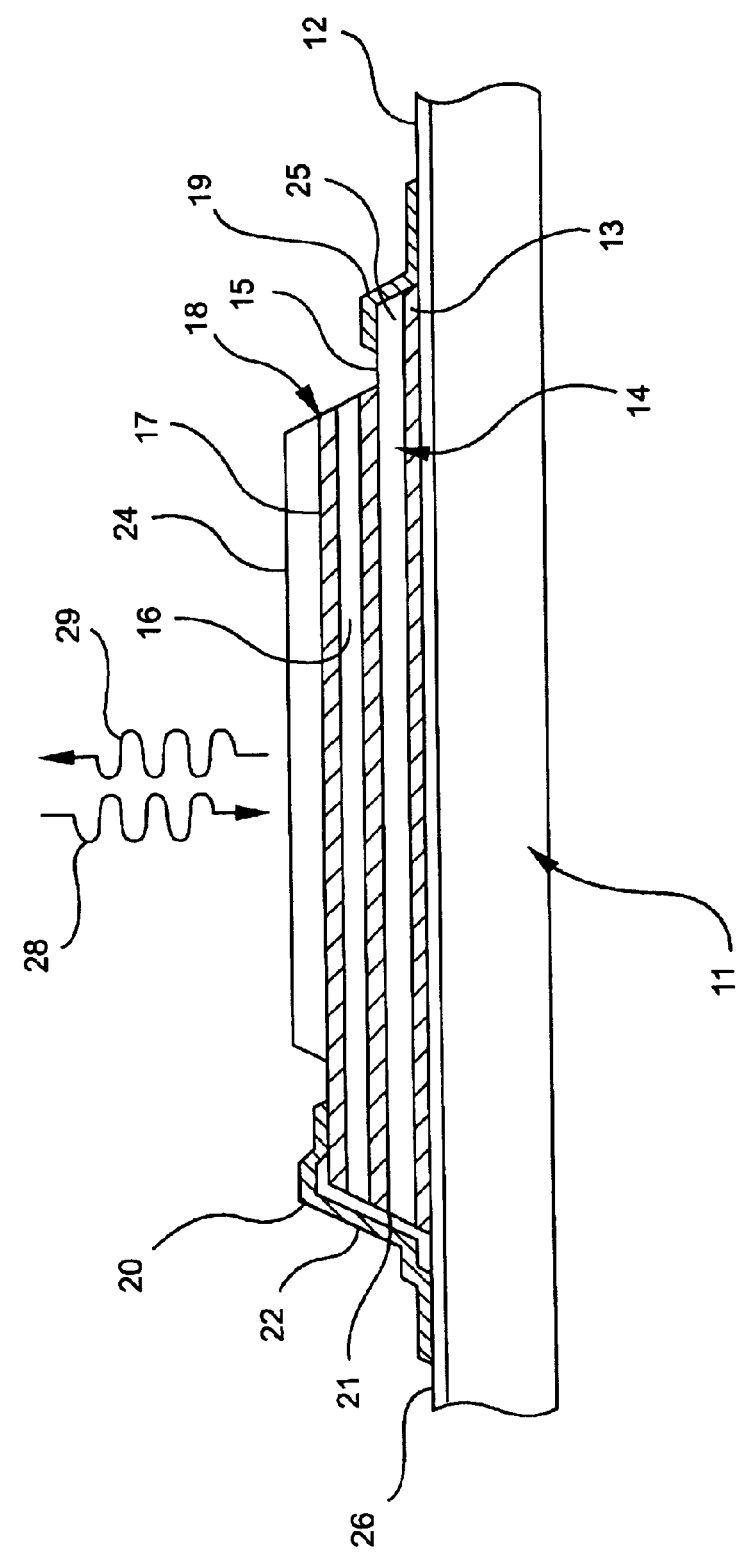
FIG. 1 is a cross-sectional view of a single element modulator.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows. FIG. 1 illustrates a single cell for an SLM. This cell is located on a silicon CMOS IC RAM in the position normally occupied by the RAM's storage capacitor. The cell structure comprises the RAM's silicon substrate 11, an $SiO_2$ passivation layer 12, a platinum layer 13, a bottom transparent conductive indium tin oxide (ITO) layer 15, and a dielectric material 25 to form the bottom mirror 14, a solid state electro-optic material 16, a top transparent conducting ITO layer 17, and a top dielectric material 24 that forms the mirror 18. Contact is made to the bottom ITO layer with aluminum metallization 19 and to the top ITO layer with metallization 20 having a sidewall 22 that is insulated from other conductive layers by the $SiO_2$ deposition 21. The aluminum metallizations connect to address lines that connect to transistor drivers.

The top mirror and the bottom mirror form a Fabry-Perot etalon whose overall reflectivity is high except at a resonance wavelength determined by the optical path length in the electro-optic material. The results are the same as for a classical Fabry-Perot etalon with an air space whose path length is varied by moving one of the mirrors. When an electro-optic material is used, application of a voltage changes the index of refraction and, if it is piezoelectric, its physical thickness. More details found in copending application Ser. No.: 09/420,475, filed Oct. 19, 1999 by Feiling Wang now U.S. Pat. No. 6,211,993 B1 the entire contents of which is incorporated herein by reference.

The top and bottom mirrors are dielectric stacks of alternating layers of low and high index of refraction material having an optical thickness of one quarter the wavelength of the light being reflected. Common materials for this purpose are $SiO_2$ and $TiO_2$ or $Ta_2O_5$ and deposition of these is compatible with silicon CMOS RAMs. With platinum layer 11, a 520 nm thick $SiO_2$ layer 12, and a 300 nm thick ITO layer, for example, only three periods of alternating layers of $SiO_2$ and $Ta_2O_5$ are needed to achieve a 98% reflectivity for the bottom mirror 14. With only an ITO layer 17, the top mirror 18 needs six periods, however. By proper matching of characteristics the incident light 28 is selectively modulated to control the output optical signal 29.

A process for making an SLM on a silicon IC wafer having isolated, but functioning, p-channel MOSFETs and a 1 μm feature size was undertaken as follows. Lead lanthanum zirconate titanate (PLZT) was chosen as the electro-optic material, but this requires a process temperature in excess of the aluminum metallization's melting point of 660° C. The aluminum was removed using a 95% phosphoric–5% nitric acid etch leaving the, as supplied, $SiO_2$ layer.

Three periods of $SiO_2$ and $Ta_2O_5$ was sputter deposited with layer thicknesses suitable for a He-Ne laser wavelength of 633 nm. The wafer was then annealed by raising the temperature to 400° C. over 60 minutes, then to 575° C. over 120 minutes, held at this temperature for 60 minutes, then lowered to 400° C. over 220 minutes, and then lowered to room temperature over 60 minutes. This was followed with 300 nm thick ITO layer that was sputter deposited. The wafer was again annealed with the same profile.

Next, the electro-optic layer 16 was formed using a dip coating process. The process includes dipping into a solvent-based solution, withdrawing, heating to evaporate the solvent and hardening the solute on the surface. The step can be repeated to build up the thickness. An apparatus for automating the process when used for coating small substrates with oxides such as PLZT is described in "An Automatic Dip Coating Process for Dielectric Thin and Thick Films, K. K. Li et al., Integrated Ferroelectrics, Vol. 3, pp 81–89 (1993), incorporated herein by reference.

Coating was undertaken using an apparatus such as that described in the reference. The one constructed included a 45-cm long vertical tube furnace positioned about 12 cm above the dip-coating solution container. This container was at ambient since the solutions are resistant to hydrolyzation. A wafer holder was connected to a chromel wire that passed through the tube furnace and a small hole in a cap at the top and then to a computer controlled pulling motor.

In this example, a first coating solution was prepared to produce $Pb_{1-x}La_xTiO_3$ (PLT) with x=0.09. A homogeneous solution of precursors for the three cations ($Pb^{++}$, $La^{+++}$, and $Ti^{++++}$) was obtained by mixing appropriate amounts of lead subacetate, hydrated lanthanum acetate, and titanium di-isopropyl bis acetylacetonate in methyl alcohol. The concentration was about 8 grams of PLT per 100 grams of solution. A base coating of PLT can facilitate the nucleation of the PLZT. The substrate was dipped into the solution at the rate of 5 mm/sec and immediately pulled out into the furnace at the same rate. It took about 24 seconds to reach the furnace, during which time, the coating dried. After reaching the center of the furnace, the substrate was held there for 2 minutes (soaked) to fire the coating at a temperature of 700° C. This temperature level is also used for annealing silicon CMOS wafers. Then the substrate was lowered out of the furnace at about 5 mm/sec. into the solution. It also took about 24 sec. to travel from the bottom of the furnace to the solution, during which time the substrate cooled down. Two coats of PLT were applied with an estimated total thickness of 20 nm in this example.

Next, a PLZT with a formula of $(Pb_{1-x}La_x)(Zr_yTi_{1-y})O_3$ precursor solution was prepared. Zirconium acetate was used for the $Zr^{++++}$ cation. The proportions of cations was selected to produce x=0.09 and y=0.65. The dip coating sequence was the same as for the PLT layers, but 25 coats were applied to achieve a total thickness of PLT and PLZT of about 1290 nm. The 1290 nm thickness stated above produces an optical thickness in the PLZT of 10 integer multiples of half a wavelength for a He-Ne laser. The thickness is an estimate based on the number of coats. This was derived from other samples with the same dip coating process parameters and a few coats whose total thickness was measured with a stylus-type profilometer to determine a thickness per coat, in this case, 50 nm. It is desirable to have a minimum thickness of under 2000 nm, for example, to reduce the required voltage, the processing time, and to minimize stress in the film and thereby increase production yield.

The ITO layer was then sputter deposited, followed by the top $SiO_2$ and $Ta_2O_5$ dielectric mirror. Next, using a standard photolithography process with 16% hydrochloric acid, the top mirror was etched, followed by the top ITO and PLZT layers. Aluminum was evaporated to form the contacts.

After completing the process, the p-channel MOSFETs are operational and can be used as a control circuit for the display modulator.

Figure 2:
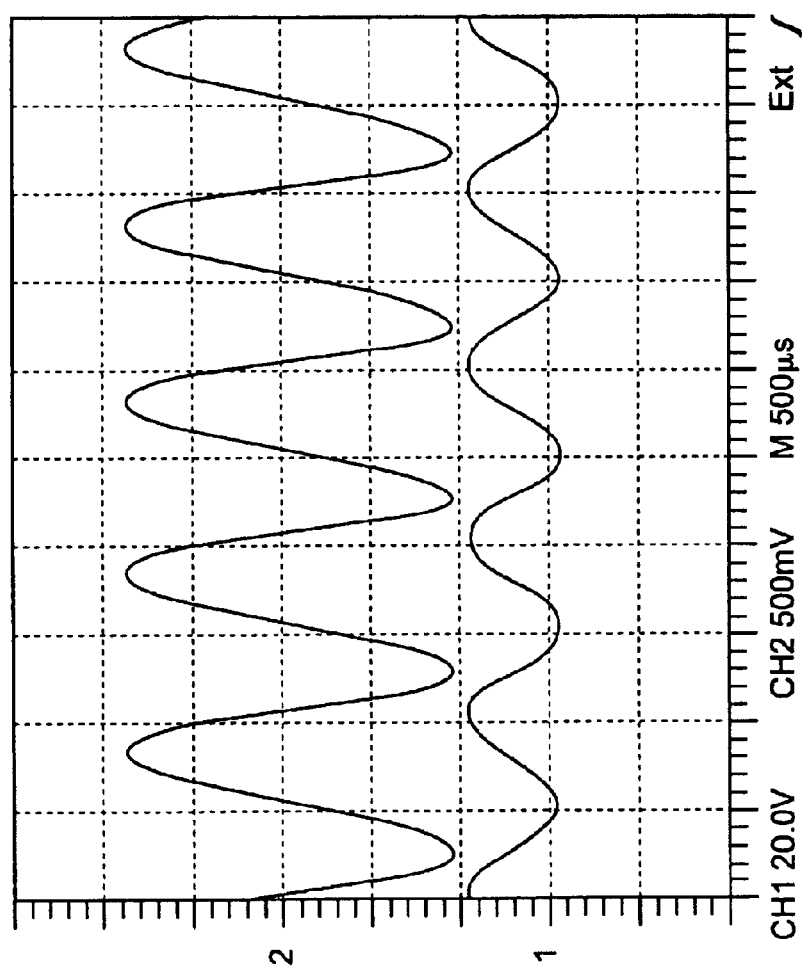
FIG. 2 shows light amplitude modulation in response to a 20-volt sinewave.

Single modulator elements were illuminated with a 633 nm He-Ne laser and a 20-volt peak-to-peak sinewave was applied. A typical result for one element is shown in FIG. 2. The lower trace shows the applied voltage and the upper trace indicates the intensity modulation of the reflected light. Note that the lower trace is 90° out of phase and the laser angle of incidence was a few degrees off normal in order to obtain the maximum effect from the etalon. In practice, a tunable laser is desirable.

A preferred method of making a single element modulators includes depositing a three period dielectric stack on a silicon wafer followed by a sputter deposited a 300 nm (quarter wavelength) ITO film onto the dielectric stack. On receipt, the wafer was annealed at 550° C. using the annealing cycle for the previous example. PLZT was deposited by dip coating following the procedure above to a thickness of about 1 µm. ITO was sputter deposited on the PLZT layer. The resulting film did not look transparent, most likely because the sputtering was performed at room temperature without an oxygen atmosphere. A 2 hour 450° C. anneal in air produced a light transparent film with a resistance of about 100 Ω/□.

A lift off technique with an hydrochloric acid etch was used to remove portions of the ITO layer and produce isolated areas 300 µm wide by 500 µm long. Platinum was sputter deposited over patterned photoresist and lifted off to make connections to the ITO areas with platinum and gold used for contact pads.

Next, the top dielectric stack was deposited using $SiO_2$ and $Ta_2O_5$ covering the entire wafer. The stack was etched in 1 to 5 diluted hydrofluoric acid to open windows to the contact pads.

Figure 3:
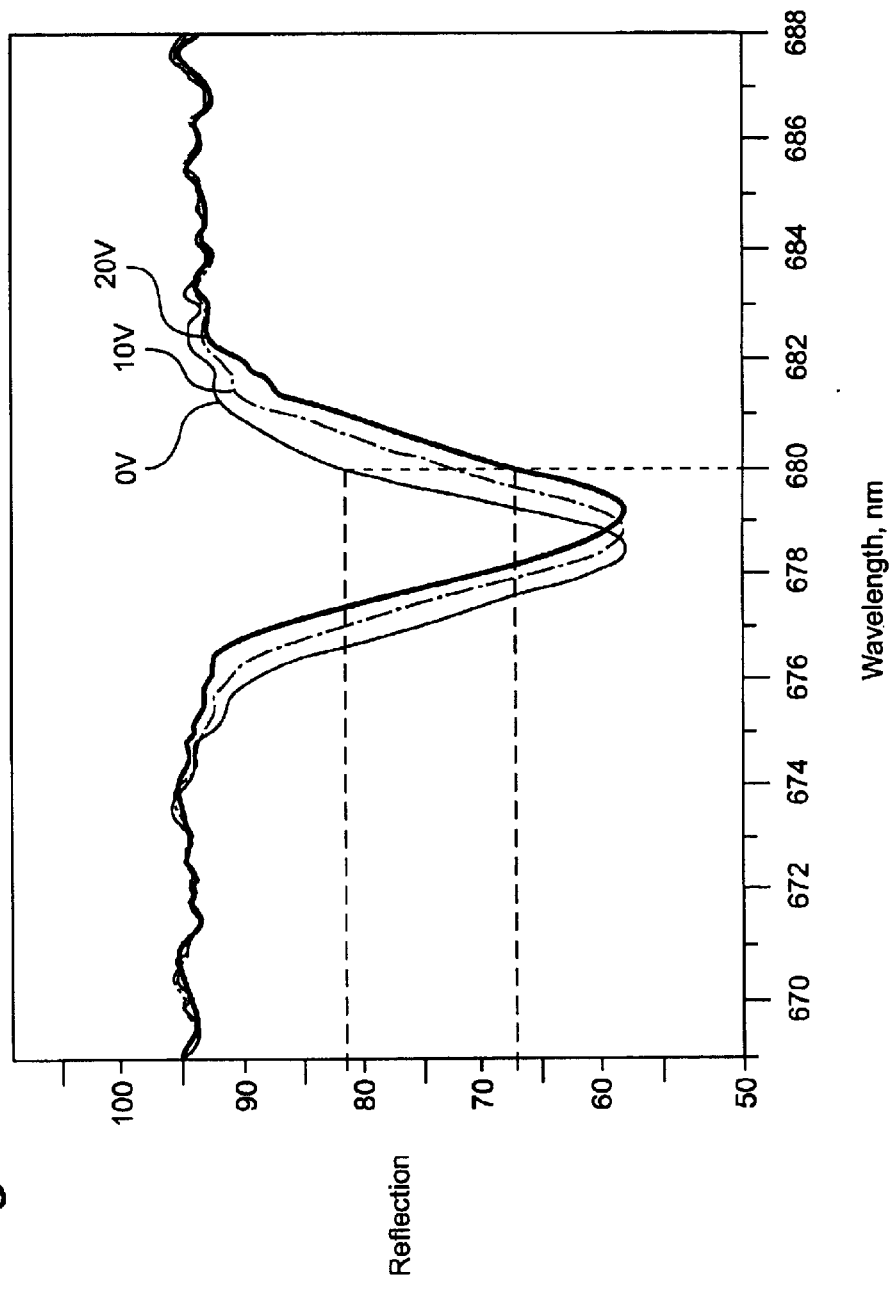
FIG. 3 shows the reflectance of a single element modulator as a function of wavelength when voltages of 0, 10, and 20 volts are applied.

FIG. 3 shows light reflected from one of the elements as a function of wavelength for applied voltages of 0, 10, and 20 volts. Maximum modulation can be achieved by selecting the wavelength used. As illustrated, a wavelength of about 680 run produces a 15% change in reflectivity with a 20 volts applied.

Figure 4:
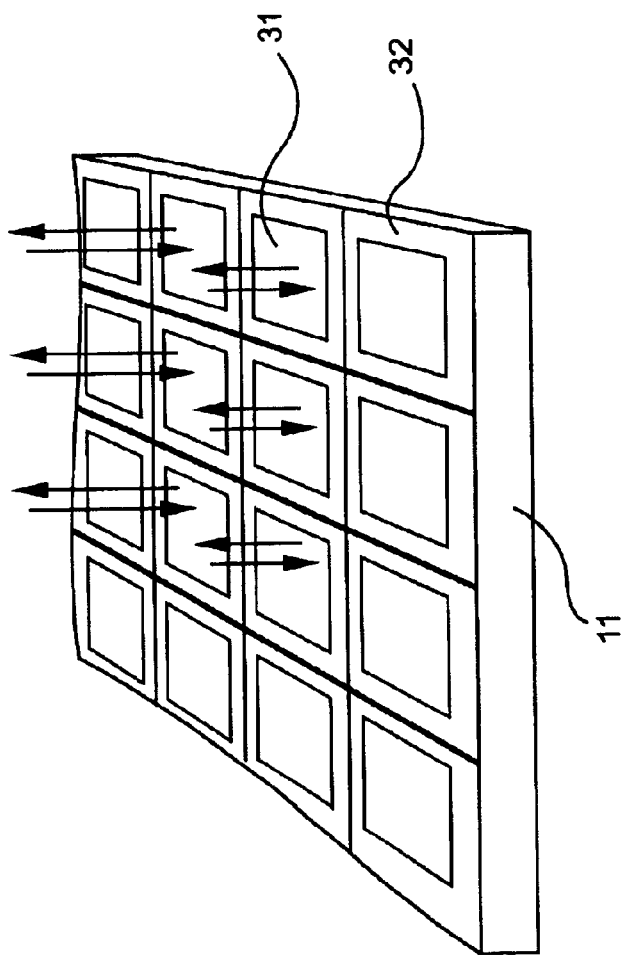
FIG. 4 illustrates an array of modulators on a RAM integrated circuit wherein the modulators do not overlap the RAM cells.

One problem in depositing PLZT on silicon is the difference in thermal expansion coefficients that causes cracking of the deposited PLZT films due to temperature cycling during deposition. The difference can be reduced by using different formulations for the PLZT. In particular, increasing the amount of zirconium and decreasing the amount of lanthanum is one preferred method of improving thermal matching of the electro-optic film to the silicon substrate. Three samples were prepared with y=0.80 and x=0, 0.3, and 0.6. It was found that the sample with x=0.3 produced a ferroelectric hysteresis loop with the steepest slopes, as shown in FIG. 4. It is known that good ferroelectric properties produce good electro-optic properties.

In order to construct an SLM, the PLZT can be deposited on a silicon IC with suitable circuitry for driving the electro-optic elements. There are several possible commercial sources of MOSFET ICs. Hewlett Packard Co., Marina Del Ray, Calif. has a RAM structure that uses a standard 0.8 µm feature size suitable for 5-volt operation. Meadowlark Optics, Inc., Frederick, Colo., has a wafer designed for driving liquid crystal SLMs that is suitable for 15-volt operation. The part numbered Z468A01 normally drives a Hex 69 SLM. This uses Mitel Semiconductor's CT43H process. A German manufacturer, ExFab, has an IC process design with a 1 µm feature size and 100-volt breakdown.

All of these use standard silicon processing and materials and survive the processing necessary to make PLZT-based modulator elements. Once modulator elements are deposited, the procedures for interconnecting elements and driving transistors through window etching and metallization can use copper in place of aluminum. This may be advantageous because it has a higher melting point and does not have to be removed prior to depositing the PLZT.

Generally, SLMs are built as square arrays such as 256× 256 pixels, although other configurations are possible. Ultimately, it would be desirable to use a configuration encountered in computer video RAMs, such as 640×480 and up to 1600×1200, because it is easier to interface to off-chip controllers, e.g., a personal computer. Although it is not essential to use a video RAM configuration, or even a RAM integrated circuit (the Meadowlark chip is based on shift registers), this choice means that existing image generating software can be used to generate control signals for the modulation elements.

FIG. 4 illustrates an array of modulators 31 positioned adjacent corresponding RAM cells 32 on a silicon substrate 11. This envisions a standard RAM design with extra area between RAM cells for the modulator elements. There are two types of RAMs, dynamic (DRAMs) and static (SRAMs). When using a DRAM, the modulator element replaces the storage capacitor used for memory. DRAMS have the advantage of having smaller cell sizes so that the fill factor, the percentage of the chip area covered by modulator are is maximized. SRAM cells have flip-flops that have one output that toggles between a 0 and a 1 state, i.e., 0 volts and the chip supply voltage. In this case, the output is connected to one of the modulator contacts, e.g., 20 in FIG. 1 with the other contact 19 grounded.

Figure 5:
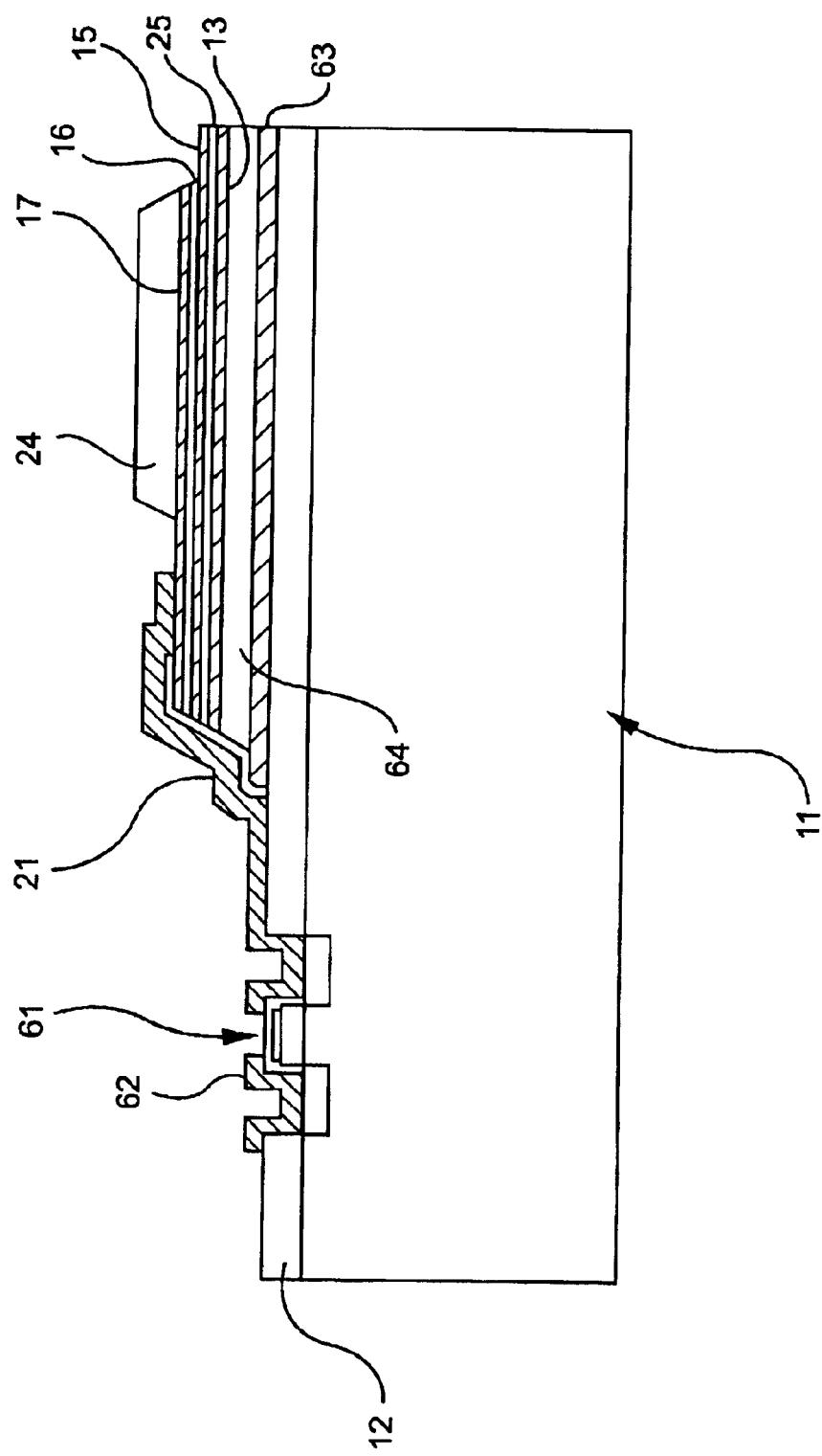
FIG. 5 is a cross-sectional view of a modulator adjacent a MOSFET driver on an IC.

FIG. 5 illustrates a finished modulator deposited on a RAM (or other) IC and connected to a MOSFET. The modulator is similar to the modulator illustrated in FIG. 1 and like numerals are used to designate like layers. The position of a MOSFET transistor 61 is indicated by the arrow. The process of making, starting with a finished RAM IC using aluminum metallization 62, is as follows. First, the aluminum metallization 62 is removed with 95% phosphoric–5% nitric acid. Then a layer of ITO 63 is sputter deposited over the entire wafer. This layer is used as an etch stop, not a contact. This is followed by a sputter deposited layer of $SiO_2$ (or $Si_3N_4$) 64. Then a second layer of platinum 13 is deposited to form a base for the dielectric stack 25 that is then deposited. On top of this, a bottom contact ITO layer 15 is deposited, followed by a PLZT layer 16, a top contact ITO layer 17 and the top dielectric stack 24, all as above.

At this point, the procedure includes selectively patterning with resist and etch selective layers until the underlying gate, source, and drain regions of the IC were again exposed. The top dielectric stack 24 can be etched with hydrofluoric acid (HF). HF, however, does not etch ITO 17. It is etched with hydrochloric acid (HCl) to leave a projection out from under the top dielectric stack. HCl does not etch the dielectric stack, nor PLZT, or $SiO_2$. Then, the PLZT layer 16 is selectively etched with HF. The bottom ITO electrode 15 is etched with HCl leaving a projection out from under the PLZT. Then, HF is used to etch the dielectric stack 25. The platinum layer 13 is removed with a lift-off technique. HF is used for the $SiO_2$ layer 64, while the etch stop ITO layer 63 prevents the HF from attacking the gate oxide and silicon source and drain regions. This leaves isolated modulator cells sitting on the insulating layer underneath. The ITO 63 is then etched away to expose them. Lastly, aluminum is evaporated and patterned with the 95% phosphoric–5% nitric acid. Generally, at least two layers of metallization are required. As illustrated, the top ITO contact layer connects to a source (or drain) of on of the MOSFETs. The bottom contact ITO layer is connected to a ground bus.

Figure 6:
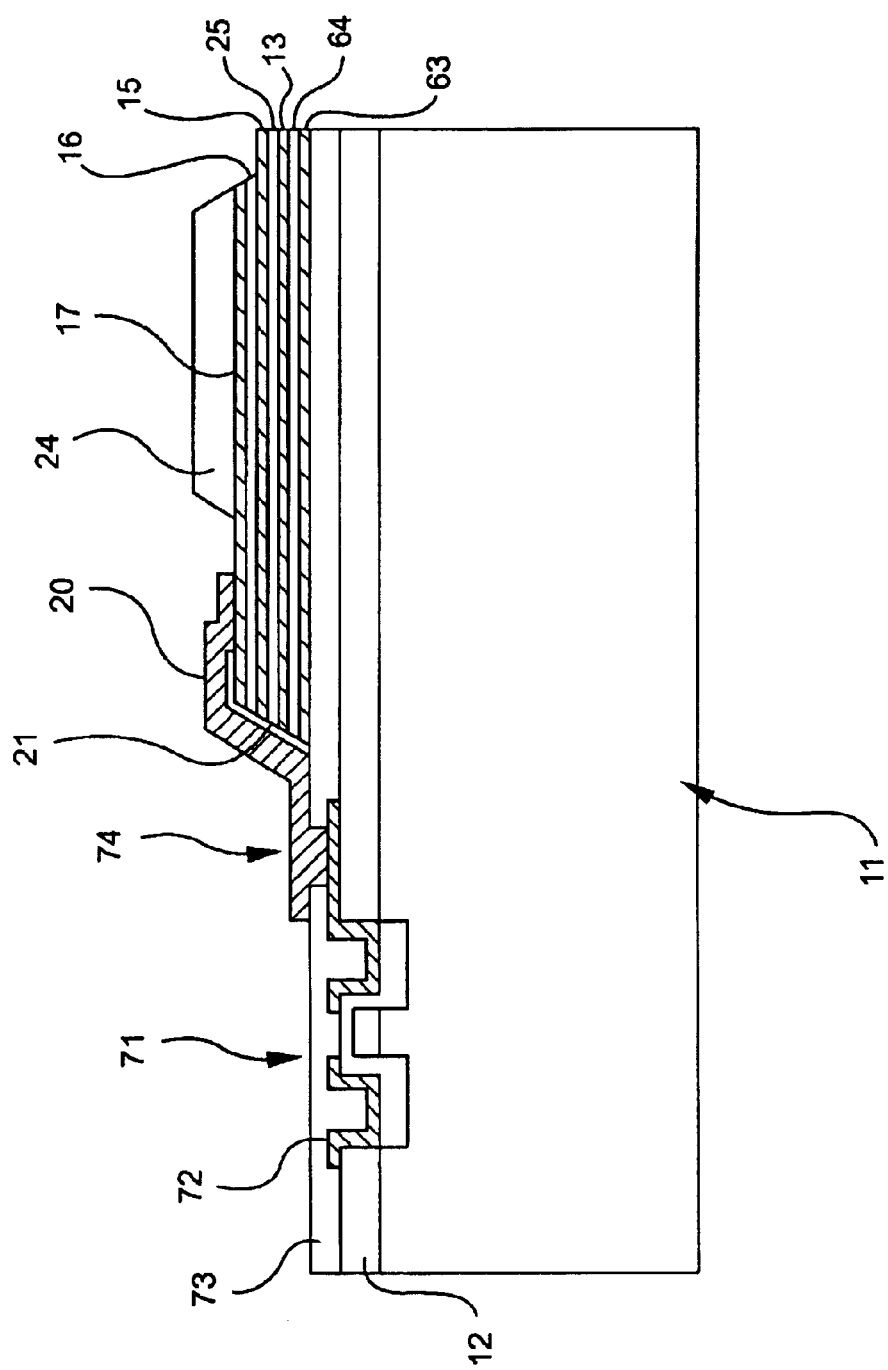
FIG. 6 is a cross-sectional view of a modulator adjacent a MOSFET driver on an IC that uses a copper metallization process.

Recently, copper, deposited on a thin layer of a material such as tantalum, has been introduced to replace aluminum. This is advantageous because its higher melting point means that it would not have to be removed prior to depositing the modulator cells and redeposited afterwards. FIG. 6 illustrates a finished structure that is similar except that an extra oxidation protection layer 73 is used. The process is slightly different as the pixelated structure is formed over layer 73. Rather than removing the copper metallization 72, the first step is to deposit either $SiO_2$ or $Si_3N_4$ to protect it from oxidation. After that, the deposition steps are the same.

The process of isolating and making electrical contacts proceeds as for the aluminum metallization wafer including the etching of the ITO etch stop layer. At this point, it is necessary to etch windows 74 in the oxidation protection layer over the copper metallization 72 contacting the source (or drain) of one of the MOSFET driving transistor 71 and a ground bus. The last step is to connect the top ITO layer 17 contact to the MOSFET 71 with metallization 20 that is insulated by an $SiO_2$ layer 21 that isolates the sidewall from the layers and to connect the bottom ITO layer 15 contact to a ground bus.

Design of a PLZT-based SLM that are to be deposited on RAM chips must take into account two material properties, capacitance and modulation sensitivity. The PLZT layers are fairly thick, but with a dielectric constant of about 500, the capacitance is still high. For example, a 20 $\mu$m×20 $\mu$m element area with a nominal 1 $\mu$m thick layer has a capacitance of about 1.8 pf. The typical MOSFET for a RAM cell has a maximum current source or sink capability of less than about 0.1 ma because this is adequate to charge parasitic or DRAM capacitance. As a result, small gate widths can be used and chip size minimized. However, at the expense of chip area, the gate widths and, hence, drive currents can be increased proportionately.

For SRAM, DRAM and shift register based MOSFET designs, a simple totem pole buffer, can be provided. For increased current capability the width of the gates are increased as needed. In the case of an SRAM, for instance, the input is connected to one of the flip-flop outputs and the output to one contact on the modulator element. Increasing gate width also increases the MOSFET input capacitance. Therefore, it may be desirable to buffer the modulator driving buffer with an input totem pole buffer in order not to load the RAM circuitry and slow it down.

As an example, assuming a maximum 1 ma drive current, the maximum rate of change of driving voltage (slew rate) is 0.55 v/ns. This means that if 15 volts were required for adequate modulation, 24 ns would be required to reach it.

The modulation efficiency is not significantly effected if the frame rate were in the millisecond range. However, because RAMs use multiplexors to drive individual memory elements, the slew rate limits the pixel refresh cycle time to longer than this. This is not a serious limitation. For example, assuming even a 1024×768 array, a 60 Hz frame rate and a 16 bit address architecture, the maximum refresh cycle is about be 230 ns. If the element were reduced to 19 $\mu$m square, even a 0.1 ma drive is adequate.

It should be noted that, the limit on reducing element size is due to optical diffraction effects that become pronounced when the pixel size approaches the wavelength of the incoming light. Even a 20 $\mu$m size produces some diffraction effects and some applications may benefit from larger element sizes such as 50 $\mu$m. This requires a chip size of about 50 mm (2 inches) and 8 inch diameter wafers are available for fabrication. Those skilled in the art will appreciate that there are a number of tradeoffs that depend on the particular application. For instance, useful SLMs do not all require such high definition as in the example just given.

With the modulation sensitivity of the PLZT modulators, five volts is inadequate for many applications. CMOS transistors have been produced for 15-volt operation. Also, power MOSFETs with a 1 kV breakdown are available. The voltage breakdown is a function of the separation between the source and the drain and the thickness of the gate oxide. Higher voltage operation can be achieved by increasing both. Usually, it is desirable to have the length of the gate approach, but not overlap, the separation between source and drain regions in order to have low on-resistance and, at the same time, low gate-to-source and gate-to-drain capacitance. Because the feature sizes are no longer sub-micron, the design and production of a high voltage RAM is, in some respects, easier. However, the larger chip area and slower speeds can limit the number of pixels.

This can be ameliorated because the large PLZT capacitance makes the use of dynamic RAMs possible and attractive. Assuming a leakage current of 1 pa, typical of an integrated circuit MOSFET, once the above 1.8 pf example is charged to 20 volts, decay to zero takes about 36 ms. This is much longer than the typical refresh rate. The advantage of a dynamic RAM is that only one transistor is used per cell so that the percentage area that can be covered by PLZT is greater than in a static RAM.

It is possible to use almost all of the chip area using planarization. This process covers the entire chip with a layer such as $SiO_2$ so that the entire chip is uniformly flat as in the copper metallization-based chip discussed above. The modulator is then be deposited as usual. However, during the etching steps, only so much modulator area as needed to isolate them and provide areas for etching windows to the underlying MOSFET drivers and ground busses is removed.

Figure 7:
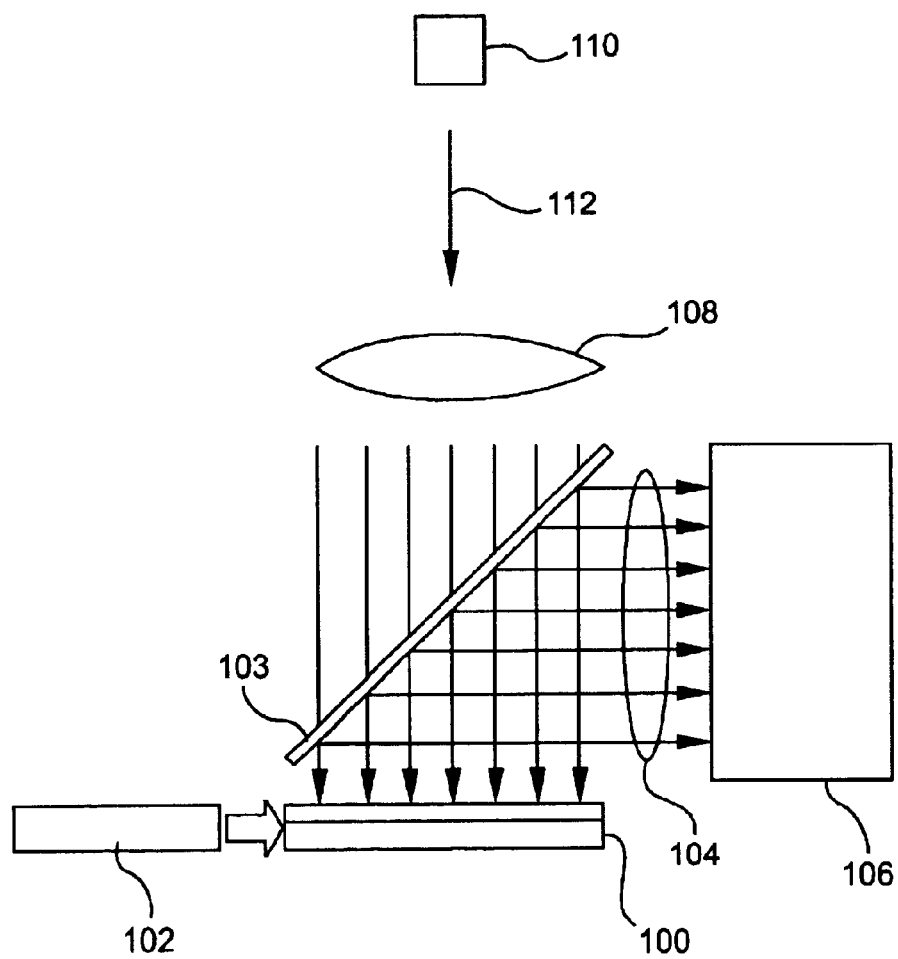
FIG.7 is a schematic view of a spatial light modulator system in accordance with the invention.

FIG. 7 shows a modulator system in which light 112 from a laser or other light source 110 is directed by optics 108 onto a beamsplitter 103 such that light is directed onto modulator 100. Modulator and the on-board driver, memory and/or control circuits can be controlled by an external digital signal processor such as computer 102. The modulated output signal is reflected by beamsplitter 103 through any required optics 104 onto a detector 106 that can include an optical memory and/or image processing system.

Figure 8:
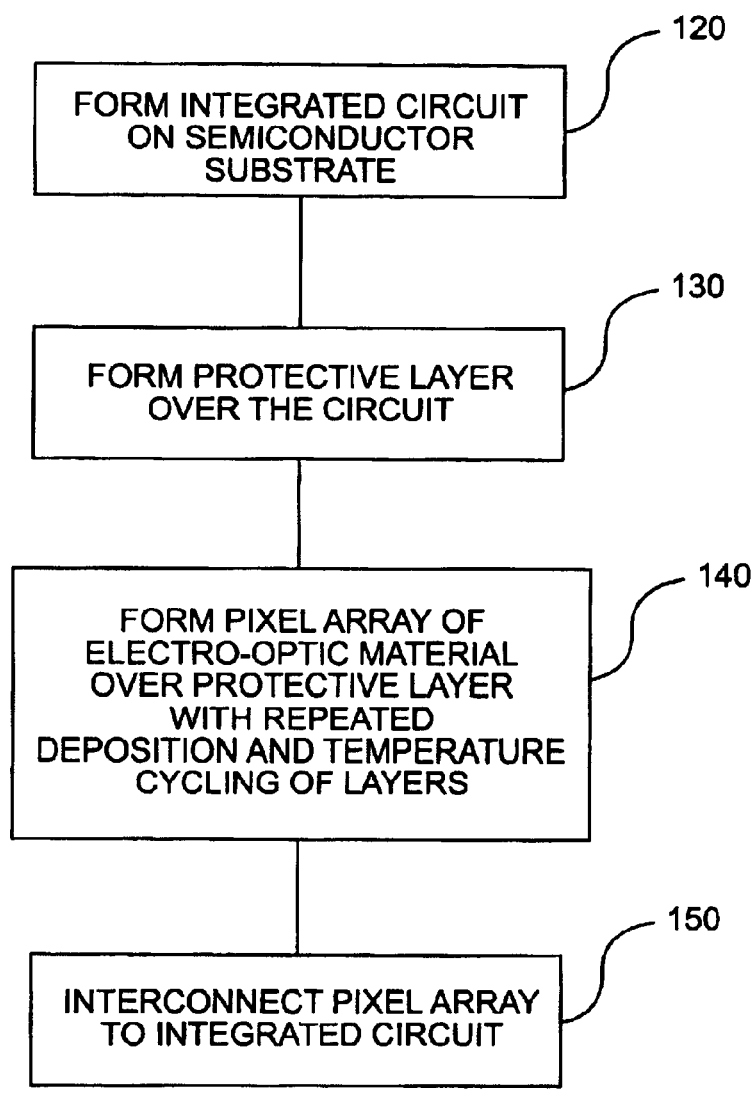
FIG.8 is a process flow sequence for fabricating a spatial light modulator in accordance with the invention.

FIG. 8 illustrates a process sequence in accordance with the invention as described in greater detail above. First an integrated circuit on a semiconductor substrate is provided 120. Second, an optional protective layer is formed 130 over the circuit. A series of layers of electro-optic material is formed by repeated deposition and temperature cycling 140. This is followed by patterning and interconnecting 150 the pixel array to the circuit.

While this invention has been particularly shown and described with references to preferred embodiments thereof, it will be understood by those skilled in the art that various changes in form and details may be made therein without departing from the scope of the invention encompassed by the appended claims.

What is claimed is:

1. A spatial light modulator comprising:

an array of pixels formed on a semiconductor substrate, each pixel including a solid state electro-optic material positioned between a first electrode and a second electrode;

a first layer of dielectric material forming a first mirror underneath the electro-optic material and a second layer of dielectric material forming a second mirror above the electro-optic material, the first mirror and second mirror forming a cavity; and an array of pixel circuits formed with the semiconductor substrate, each pixel being connected to a pixel circuit, wherein the pixel circuits comprise an array of transistors formed on a silicon substrate.

2. The modulator of claim 1 wherein the solid state electro-optic material comprises a ceramic material.

3. The modulator of claim 1 wherein the solid state electro-optic material comprises PLZT.

4. The modulator of claim 1 wherein the electro-optic material
comprises a thin film layer having a thickness of 2000 nm or less.

5. The modulator of claim 1 wherein the electro-optic material
comprises a plurality of layers.

6. The modulator of claim 5 wherein a first electro-optic layer comprises a first electro-optic material and additional layers comprise a second electro-optic material.

7. The modulator of claim 6 wherein the first layer comprises PLZT.

8. The modulator of claim 6 wherein the additional layers comprise PLZT.

9. The modulator of claim 1 wherein each electrode comprises
an electrically conductive layer that contacts a dielectric layer.

10. The modulator of claim 1 wherein the semiconductor substrate comprises a CMOS integrated circuit.

11. The modulator of claim 1 further comprising a light source
and an optical coupler.

12. The modulator of claim 1 further comprising a memory circuit co-located with each pixel.

13. The modulator of claim 1 wherein each pixel circuit comprises a random access memory.

14. The modulator of claim 1 wherein the first and second layers of dielectric
material each comprise a stack of dielectric thin films.

15. The modulator of claim 1 wherein the first and second electrodes comprise an optically transmissive conductive material.

16. The modulator of claim 1 further comprising a copper interconnect extending from each pixel mesa along a mesa sidewall to a circuit contact of a pixel circuit.

17. The modulator of claim 1 wherein each pixel is connected to a respective pixel circuit from among the array of pixel circuits.

18. The modulator of claim 1 used as a Fabry-Perot filter.

* * * * *